(12) United States Patent
Fujieda et al.

(10) Patent No.: US 7,077,099 B2
(45) Date of Patent: Jul. 18, 2006

(54) DIRECT INJECTION TYPE INTERNAL COMBUSTION ENGINE

(75) Inventors: Mamoru Fujieda, Tomobe (JP); Hiroshi Fujii, Shinagawa (JP); Takuya Shiraishi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/663,747

(22) Filed: Sep. 17, 2003

(65) Prior Publication Data

US 2004/0060539 A1 Apr. 1, 2004

Related U.S. Application Data

(62) Division of application No. 09/793,427, filed on Feb. 27, 2001, now Pat. No. 6,634,333.

(30) Foreign Application Priority Data

Feb. 28, 2000 (JP) .............................. 2000-055958

(51) Int. Cl.
*F02B 17/00* (2006.01)

(52) U.S. Cl. ............ 123/295; 123/179.16; 123/179.18; 123/308

(58) Field of Classification Search ................ 123/295, 123/497, 306, 301, 308, 179.16, 179.18
See application file for complete search history.

(56) References Cited

U.S. PATENT DOCUMENTS

| 4,196,701 | A | * | 4/1980 | Tamura et al. ............... 123/308 |
| 5,165,374 | A | | 11/1992 | Chapman et al. ............ 123/308 |
| 5,632,244 | A | | 5/1997 | Endres et al. ................ 123/306 |
| 5,771,858 | A | | 6/1998 | Yoshida et al. .............. 123/306 |
| 5,878,712 | A | | 3/1999 | Wolters et al. ............... 123/301 |
| 5,881,694 | A | * | 3/1999 | Nakada ........................ 123/305 |
| 5,992,372 | A | * | 11/1999 | Nakajima ..................... 123/295 |
| 6,062,192 | A | * | 5/2000 | Wirth et al. .................. 123/295 |
| 6,073,596 | A | | 6/2000 | Kemper ..................... 123/90.11 |
| 6,234,139 | B1 | * | 5/2001 | Taga et al. ................... 123/295 |
| 6,318,336 | B1 | | 11/2001 | Mueller ....................... 123/306 |
| 6,357,423 | B1 | * | 3/2002 | Kanno ......................... 123/497 |
| 6,467,454 | B1 | | 10/2002 | Fledersbacher et al. ..... 123/301 |

FOREIGN PATENT DOCUMENTS

| DE | 69103000 T1 | 10/1994 |
| DE | 9319545 U1 | 4/1995 |
| DE | 19700104 | 7/1997 |
| DE | 19741380 | 3/1998 |
| DE | 19733137 | 2/1999 |
| DE | 19754736 | 4/1999 |
| DE | 19932119 | 1/2001 |
| DE | 19954455 | 5/2001 |
| JP | 9-317475 | 12/1997 |

* cited by examiner

*Primary Examiner*—Willis R. Wolfe
*Assistant Examiner*—Johnny H. Hoang
(74) *Attorney, Agent, or Firm*—Crowell & Moring LLP (57) ABSTRACT

In a starting time in which an air motion is little, a means for heightening the motion is added, from the starting time a stratification combustion operation is enabled to carry out, and a discharge of an unburned fuel is minimized. From the starting time of an engine (from the first combustion cylinder) it is possible to carry out a stable stratification combustion. In accordance with the stratification combustion in the exhaust air, a large quantity of the surplus oxygen remains. In the engine in the exhaust stroke twice (two times) fuel injection is carried out and the after-burn phenomenon is caused in the exhaust port and then the exhaust gas temperature can be raised.

6 Claims, 9 Drawing Sheets

EACH OF ARROW MARKS SHOWS AN ASCENT
AND A DESCENT OF A PISTON

| NO. 1 CYLINDER | INT ↓ | COM ↑ | EXP ↓ | EXH ↑ |
|---|---|---|---|---|
| NO. 3 CYLINDER | EXH ↑ | INT ↓ | COM ↑ | EXP ↓ |
| NO. 4 CYLINDER | EXP ↓ | EXH ↑ | INT ↓ | COM ↑ |
| NO. 2 CYLINDER | COM ↑ | EXP ↓ | EXH ↑ | INT ↓ |

INT : INTAKE STROKE
COM : COMPRESSION STROKE
EXP : EXPLOSION STROKE
EXH : EXHAUST STROKE

CRANK ANGLE (DEGREE)

DIRECT INJECTION TYPE INTERNAL COMBUSTION ENGINE

This application is a divisional of Ser. No. 09/793,427 filed Feb. 27, 2001, now U.S. Pat. No. 6,634,333.

DESCRIPTION OF THE INVENTION

1. Technical Field

The present invention relates to a direct injection type internal combustion engine (hereinafter, an internal combustion engine is called as an "engine"), and in particularly to a technique for controlling a supply of air into a cylinder in a direct injection type combustion engine.

2. Prior Art

In a conventional technique of a direct injection type internal combustion engine, for example, into a cylinder the fuel is injected directly and also the fuel having a rich air-fuel mixture is gathered in a vicinity of an ignition plug and burned, as a whole it is possible to carry out a stratification combustion for forming a lean (thin) air-fuel ratio combustion. However, during a starting time of the engine, since a motion of the air in the cylinder is little, it is impossible to carry out a stratification operation.

As shown in the engine according to the prior art, a homogenous combustion for forming an uniform air-fuel mixture is employed. These prior arts are shown, for example, in Japanese application patent laid-open publication No. Hei 9-317475.

In the case of the homogenous combustion, the fuel is supplied to a whole cylinder, in a case in which the engine is cooled comparatively, such as the starting time, there is many discharge of an unburned fuel and there is a problem on an exhaust air countermeasure.

SUMMARY OF THE INVENTION

An object of the present invention is to provide a direct injection type internal combustion engine wherein during a starting time a stratification combustion operation can be carried out.

Another object of the present invention is to provide a direct injection type internal combustion engine wherein a discharge of an unburned fuel can be minimized.

According to the present invention, in the starting time in which an air motion is small, means for heightening the motion of the air is added, from the starting time it is possible to carry out the stratification combustion operation, and the discharge of the unburned fuel is minimized.

According to the present invention, in a direct injection type internal combustion engine in which a fuel is injected directly into a cylinder, in the cylinder a tumble flow of air is formed and a rich air-fuel mixture is gathered and a stratification operation is carried out, the direct injection type internal combustion engine wherein an opening and closing valve for shutting off an intake air passage for supplying the air into the cylinder and a bypass passage for bypassing the opening and closing valve and having a cross-section smaller than a cross-section of the intake air passage, and an outlet of the bypass passage is opened near to an intake valve of an outlet portion of the cylinder.

According to the present invention, an outlet portion of the air the bypass passage is opened near to center of the cylinder in a side of an ignition plug of the intake valve. According to the present invention, the opening and closing valve is a rotary valve having three positions comprising a full closing, a middle opening, and a full opening.

According to the present invention, the partition wall is constituted of a bimetal, and a valve for closing a lower side passage of the intake air passage during a low temperature time of the engine is provided, the bimetal partition wall is constituted to deform to a position in which the bimetal partition wall makes narrow an upper side passage.

According to the present invention, the direct injection type internal combustion engine comprises an intake valve for introducing air into a cylinder and provided in an outlet of the cylinder, an electromagnetic solenoid mechanism for controlling an opening and closing the intake valve, a device for forming a tumble flow of the air into the cylinder by gathering a rich air-fuel mixture in a vicinity of an ignition plug, a opening and closing valve for shutting off an intake air passage, and a bypass passage for bypassing the opening and closing valve and having a cross-section smaller than a cross-section of the intake air passage, and an outlet of the air of the bypass passage is opened near to the intake valve.

According to the present invention, an electromagnetic type variable valve mechanism in which an opening and closing timing of an intake valve and an exhaust valve is enable to control regardless to a rotation number, an opening and closing valve for shutting off an intake air passage for introducing air into a cylinder, cylinder, and a communication passage for communicating the intake air passage of adjacent cylinders, thereby an intake stroke time of one cylinder, compression air of the adjacent cylinders is flown through one of the communication passages.

According to the present invention, during the starting time, supplying the air into a cylinder through an intake valve from an intake air passage having a small cross-section, generating a tumble flow into the cylinder, and after a warming-up of the engine, increasing the cross-section area of the intake air passage than a cross-section area of the starting time.

According to the present invention, in an air supply method of an internal combustion engine, during a starting time, supplying the air into a cylinder through an intake valve from a first intake air passage having a small cross-section area, generating a tumble flow into the cylinder, after a warming-up of the engine, supplying the air into the cylinder through an intake valve from a main intake air passage which is divided into an upper state and a lower stage, and in a stratification operation region, generating the tumble flow into the cylinder by closing a lower side passage of the main intake air passage.

According to the present invention, a direct injection type internal combustion engine comprises a fuel injector for injecting directly a fuel into a combustion chamber, an ignition coil for igniting an air-fuel mixture of the combustion chamber, and an air-fuel mixture induction device for forming an air-fuel mixture region which enable to easily spark at a vicinity of the ignition plug during a starting of the internal combustion engine.

According to the present invention, the air-fuel mixture induction device comprises a tumble air supply device for forming a tumble air flow in the combustion chamber. The air-fuel mixture induction device comprises a narrow conduit passage provided adjacently side by side to a main intake air passage and a change-over valve provided in a branch portion between the conduit passage and the main intake air passage.

According to the present invention, a direct injection type internal combustion engine, wherein an air and fuel mixture induction device for inducing a mixture of an air and a fuel in a surrounding portion of an ignition plug in a cylinder by operating immediately after an operation of a starting switch of the internal combustion engine is provided, and the air and fuel mixture induction device functions to a cylinder which enters firstly to an intake stroke after at least an operation of the starting switch, the air and fuel mixture is induced to the surrounding portion of the ignition plug in the cylinder.

DESCRIPTION OF THE INVENTION

Figure 1A:
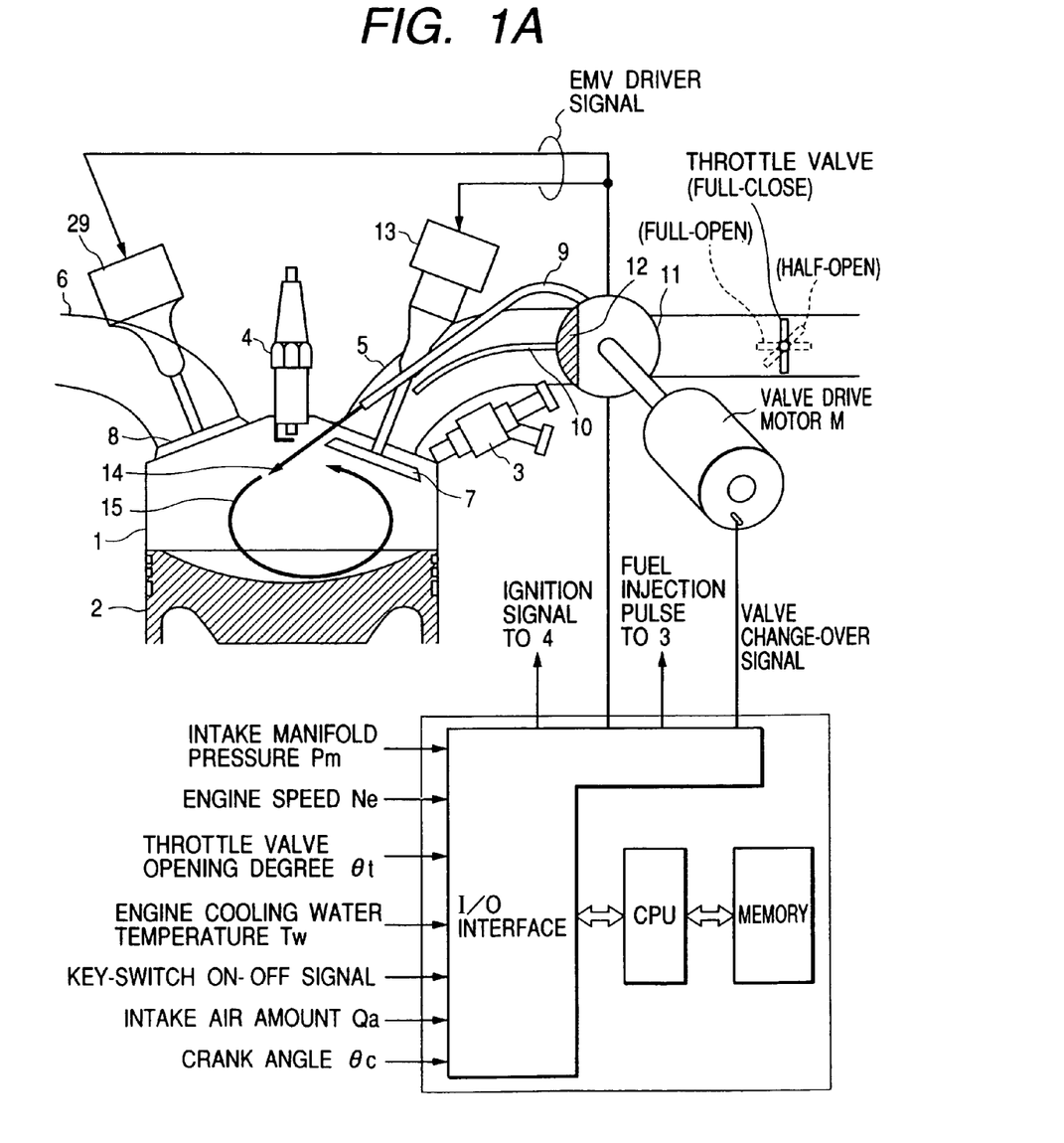
FIG. 1A is a constructional having an electric circuit flow view showing a direct injection type internal combustion engine of one embodiment according to the present invention.

FIG. 1 is a constructional view showing a direct injection type internal combustion engine of one embodiment according to the present invention. To a cylinder 1, a piston 2, a fuel injector 3, and an ignition plug 4 are provided. To an intake port 7, an intake valve 7 is provided and to an exhaust port 6, an exhaust valve 8 is provided. A downstream of a rotary valve 11 as one of a change-over valve of the intake port 5 is divided into two, which are an upper stage and a lower stage by a partitioning wall 10. In the rotary valve 11, a shut-off portion for shutting up an upper passage and a lower passage of the intake port 5.

FIG. 1 shows, in a starting time of the engine, a last half state of an intake stroke. The intake valve 7 is opened and the piston 2 is descended and to the cylinder 1 the air is flown. Since the rotary valve 11 presents a full-closing state, the air is flown into the cylinder 1 as a jet flow 14 through a passage 9 which is arranged bypassing the rotary valve 11 and a tumble flow 15 is formed in the cylinder 1. It is desirable to have a passage diameter for the passage 9, in which a pressure of the intake stroke in the cylinder 1 is −100 mmHg (88 kPa) degree during a starting time a rotation number of 150–200 rpm.

Figure 2:
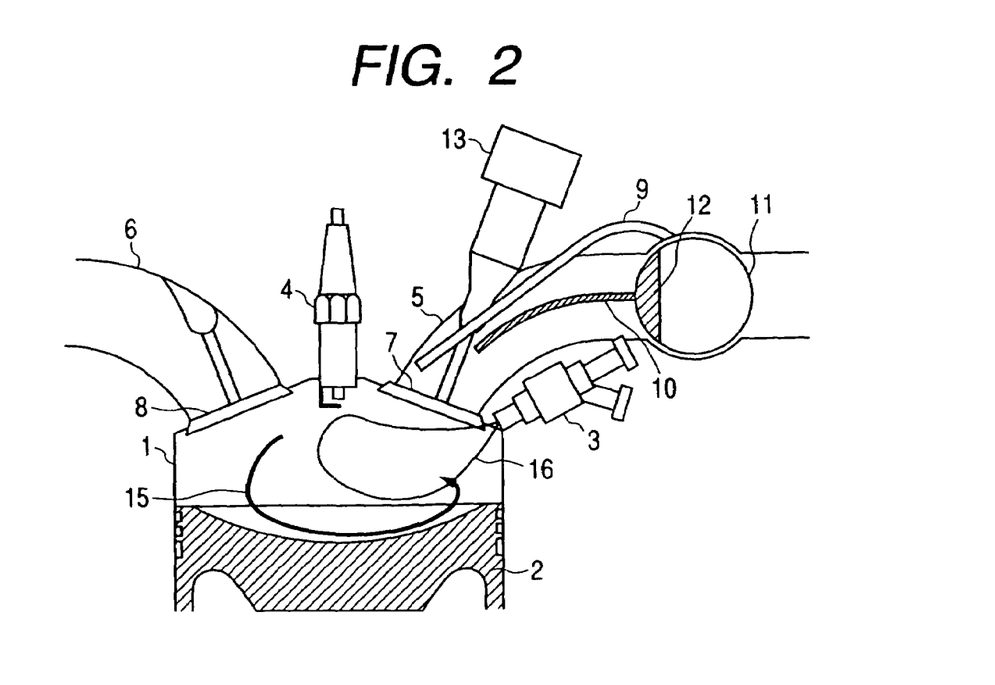
FIG. 2 is an operational view showing a direct injection type internal combustion engine of one embodiment according to the present invention.

FIG. 2 shows a last half state of a compression stroke with a crank angle 200 degrees after of the engine. The intake valve 7 is closed, and the piston 2 is ascended. The tumble flow 15 is formed with a flat to some extent. Herein, the fuel is injected from the injector 3 and a fuel spray 16 is formed. An advance of the fuel spray 16 is checked by the tumble flow 15 and also the fuel spray 16 is lifted to an upper portion and an air-fuel mixture for enabling to perform the ignition in a vicinity of the ignition plug 4 is formed and as a whole a lean (thin) stratification air-fuel mixture (A/F=25–30) is formed.

Figure 3:
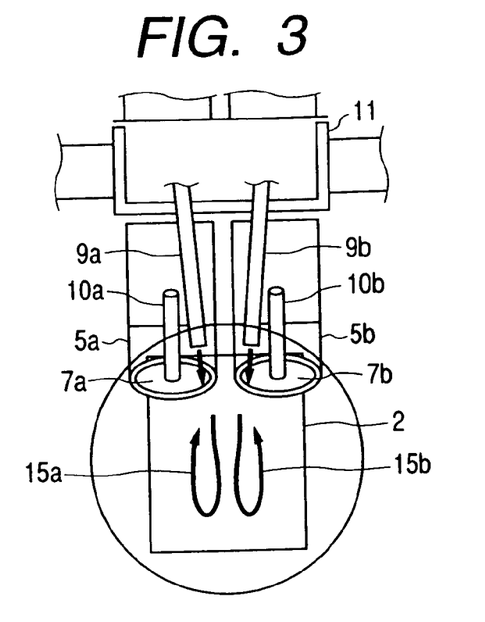
FIG. 3 is a constructional view showing a direct injection type internal combustion engine of one embodiment in which the present invention is seen from an upper face.

FIG. 3 is a view showing the engine in which the engine construction shown in FIG. 1 is seen from an upper face. The intake port 5 has two ports (5a, 5b) and in other words the engine is an intake two valves type engine. Accordingly, the engine has two intake valves 7 (7a, 7b) and two partitioning walls 10 (10a, 10b) and two passages 9 (9a. 9b) and also two tumble flows 15 (15a, 15b) are generated. The passage 9, as shown in FIG. 2, is opened in a side of the ignition plug 4 of the intake valve 7, however, as shown in FIG. 3, in a horizontal direction of the passage 9 it is desirable to install near to a center of the cylinder 1. As a result, the tumble flows 15 are strengthen each other and the strong tumble can be generated.

Figure 4:
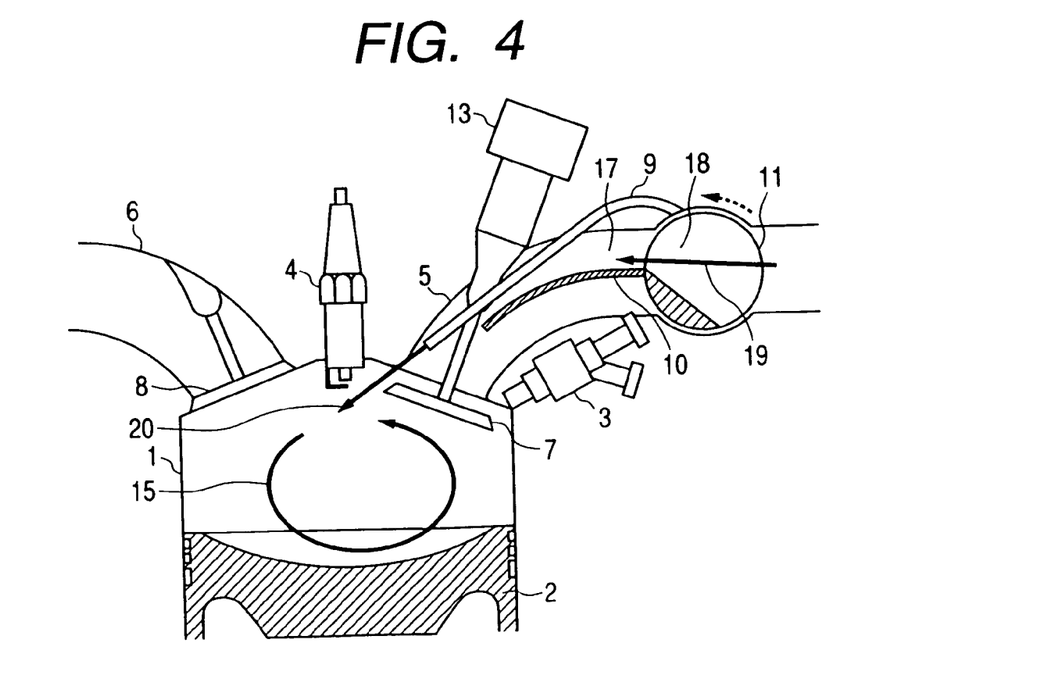
FIG. 4 is an operational view showing a direct injection type internal combustion engine of one embodiment according to the present invention.

FIG. 4 is a view showing a partial load state of the engine. During the idling and during the partial load, since the fuel consumption is regarded as an importance, the stratification operation is carried out. In this state of the engine, since only the air from the passage 9 is little, the rotary valve 11 is rotated an shown in a broken arrow mark, to perform the flow of the air in an upper portion passage 17 of the intake port 5, an opening portion 18 is suited to the upper portion passage 17. The air is flown as shown in arrow marks 19 and 20 and the air is flown into the cylinder 1 and then the tumble flow 15 is generated. In accordance with this tumble flow 15 it is possible to carry out the stratification operation.

Figure 5:
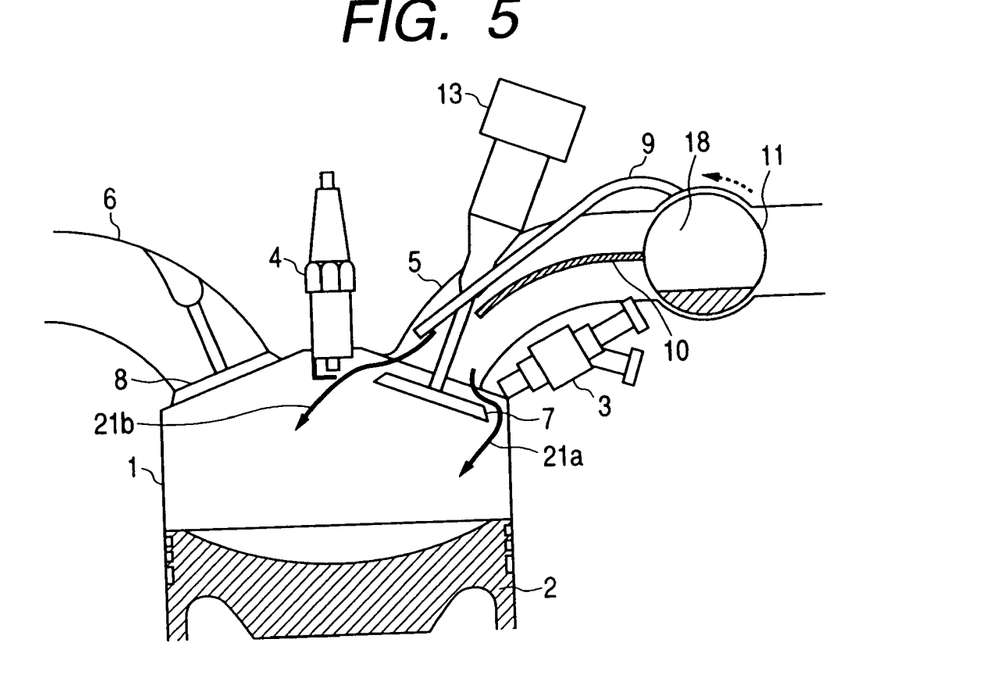
FIG. 5 is an operational view showing a direct injection type internal combustion engine of one embodiment according to the present invention.

FIG. 5 is a view showing a full load operation state of the engine. The rotary valve 11 is rotated from the construction show in FIG. 4 and the opening portion 18 is opened to a whole passage of the intake port 5. The intake air 21a and 21b are flown into the cylinder 1 from the whole passage. For this reason, the tumble flow 15 is weakened and becomes a partial motion in the cylinder 1. In the above stated state, the injection time of the fuel is carried out the intake stroke, the interior portion of the cylinder 1 is formed with a homogeneous air-fuel mixture. Further, sine all area of the intake pork 5 is used, an intake air resistance becomes small and an engine output becomes large.

The rotary valve 12 is driven by a valve drive motor M. This valve drive motor M is controlled according to a control device. The control device has a central processing unit (CPU) and to which a memory and an input and output interference (I/O interference) are connected. To the input and output interference (the I/O interference), as input signals, an engine speed (an engine rotation number) Ne, an engine cooling water temperature Tw, a key switch on-off signal, an intake air amount Qa, an intake manifold pressure Pm, a crank angle c are inputted. As output signals, in addition to an ignition signal of the engine, a valve change-over signal, an EMV (Electro Magnetic Valve) drive signal are outputted.

Figure 1B:
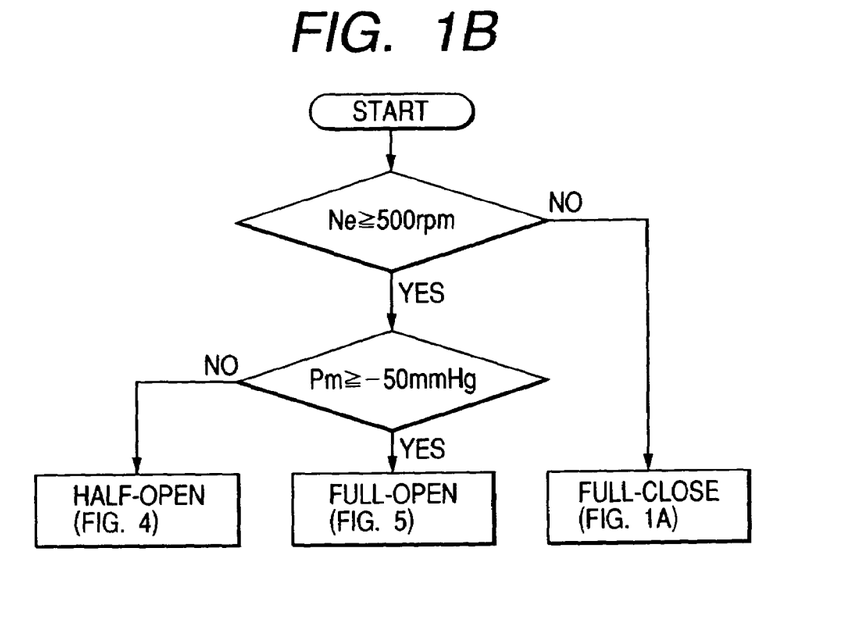
FIG. 1B is a flow chart showing a control method of a rotary valve of a direct injection type internal combustion engine of one embodiment according to the present invention.

The valve drive motor M is controlled as shown in FIG. 1B. Firstly, the engine speed Ne is judged, when Ne 500 rpm is "NO", the rotary valve 12 is made to present be the full-close and it is finished. When Ne 500 rpm is "YES", the intake manifold pressure is judged. When Pm −50 mmHg is "NO", the rotary valve 12 is made to present the half-close (FIG. 4) and it is finished. When Pm −50 mmHg is "YES", the rotary valve 12 is made to present the full-open and it is finished.

By placing the cum drive system of the intake valve and the exhaust valve according to the conventional art, an EMV (Electro Magnetic Valve) mechanism, which is open driven and close driven according to an electromagnetic valve, is used. The EMV mechanism is controlled by an open and close valve timing, which is stored in advance into the control device according to the engine speed and a load (herein, the intake air amount Qa), as an input signal. An EMV drive signal is outputted according to a crank angle c.

The rotary valve 12 can be interlocked mechanically to the throttle valve which is installed to an upstream, an opening degree of the above stated throttle valve changes in accordance with a step-in amount of an acceleration pedal. In this case, when the throttle valve is a full-open position (an idling opening degree position), the full-close position of the rotary valve 12 rotates in an anti-clockwise direction and an upper portion passage of the intake air passage is opened gradually.

When the throttle valve reaches to a half-open position, the rotary valve 12 is rotated to present a position in which the rotary valve 12 opens completely to the upper portion passage. (FIG. 4) When the throttle valve is opened further, the rotary valve 12 is rotated further in the anti-clockwise direction, then a lower side passage is going to open gradually, and the throttle valve presents to the full-open state, the rotary valve 12 presents also the full-open state. (FIG. 5)

Further, from the above stated facts, when the rotary valve 12 is controlled electrically, the opening degree of the throttle valve is detected using a throttle valve opening degree sensor, and in accordance with a detected opening degree detected by the throttle valve opening degree sensor, the valve drive motor is driven and the rotary valve 12 can be controlled. In this case, according to the intake manifold pressure Pm and the engine rotation number Ne, the opening degree is compensated and then a most suited opening degree can be obtained.

Figure 6:
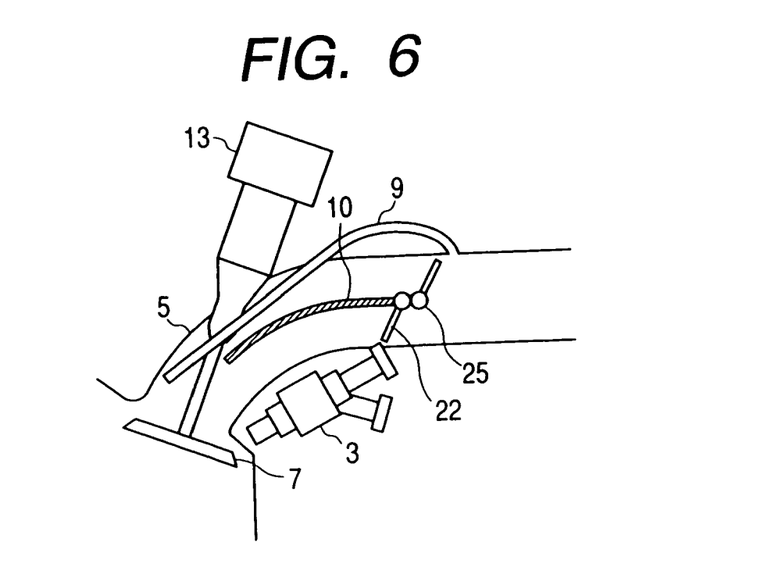
FIG. 6 is a constructional view showing a direct injection type internal combustion engine of another embodiment according to the present invention.

FIG. 6 is the engine of one embodiment according to the present invention in which by altering the rotary valve 1 shown in FIG. 1 butterfly type semi-circular shape valves 22 and 25 are used. The butterfly type semi-circular shape valve 22 opens and closes a lower side passage of the intake port 5 and the butterfly type semi-circular shape valve 25 opens and closes an upper side passage of the intake port 5. The procedure for opening the butterfly type semi-circular shape valves 22 and 25 is that since the butterfly type semi-circular shape valve 25 is opened during the partial load time and is opened at first and since the butterfly type semi-circular shape valve 22 is opened at near full-load and is opened next.

Figure 7:
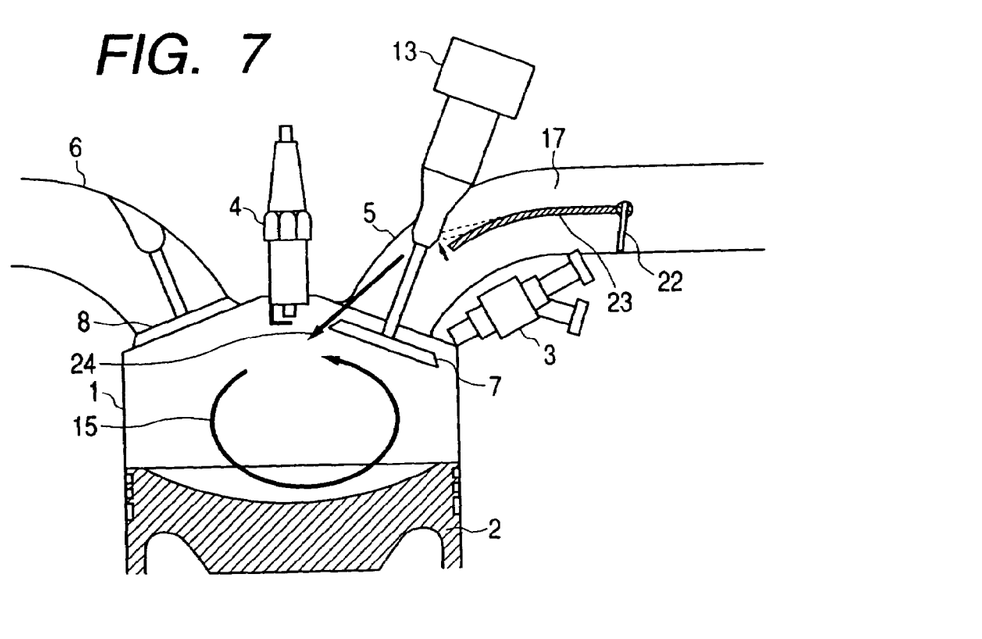
FIG. 7 is a constructional view showing a direct injection type internal combustion engine of another embodiment according to the present invention.

FIG. 7 is a direct injection type internal combustion engine of another embodiment according to the present invention. A timing shown in FIG. 7 is a last half of the intake stroke similar to that shown in FIG. 1. To the intake port 5 the butterfly type semi-circular shape valve 22 in which a lower half portion is enable to open is provided. As a partitioning wall, a bimetal type partitioning wall 23 is installed. A tip end of the bimetal type partitioning wall 23 is moved to make narrow the upper portion passage 17 of the intake port 5 when the temperature during the starting time is comparatively little and a flow velocity of an intake air 24 is heightened, even in the small intake air amount during the starting time, the tumble flow 15 can be generated.

In the engine of this embodiment according to the present invention, an ordinary valve driving manner is employed, however when a variable valve mechanism in which an opening and closing time of the intake valve 7 can be altered is added, since the intake valve 7 is opened slowly (from the starting of the downward movement of the piston 2), a pressure of the cylinder 1 during the valve opening of the intake valve 7 becomes low, the flow velocity of the air which flows into the cylinder 1 is heightened, the tumble flow can be strengthened. In particularly, during the starting time of the engine since a rotational number is low and the intake air amount is little, even the time for opening the intake valve 7 slowly the air amount to the engine is not made little.

Figure 8:
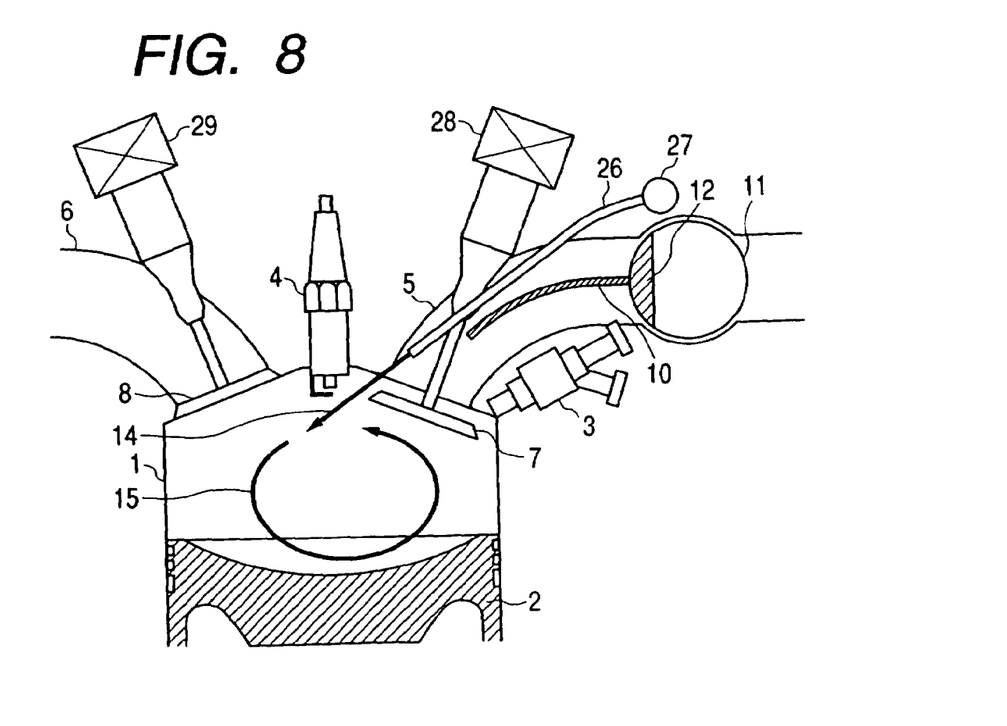
FIG. 8 is a constructional view showing a direct injection type internal combustion engine of a further embodiment according to the present invention.

FIG. 8. is a direct injection type internal combustion engine of a further embodiment according to the present invention. In the engine of this embodiment according to the present invention, EMV mechanisms 28 and 29 for driving the intake valve 7 and the exhaust valve 8 by an electro-magnetic force in which the intake valve 7 and the exhaust valve 8 are opened and closed freely in any position of a rotation angle of the engine. Further, a passage 27 for communicating the intake port 15 of the adjacent cylinders 1 (a first cylinder and a second cylinder; a third cylinder and a fourth cylinder) is provided of the four cylinders 1. FIG. 8 shows similarly the last half of the intake stroke (the first cylinder). The jet flow 14 is injected from the passage 26 and the tumble flow 15 is generated in the cylinder 1. The rotary port 11 fully-closes the intake port 5.

Figure 9:
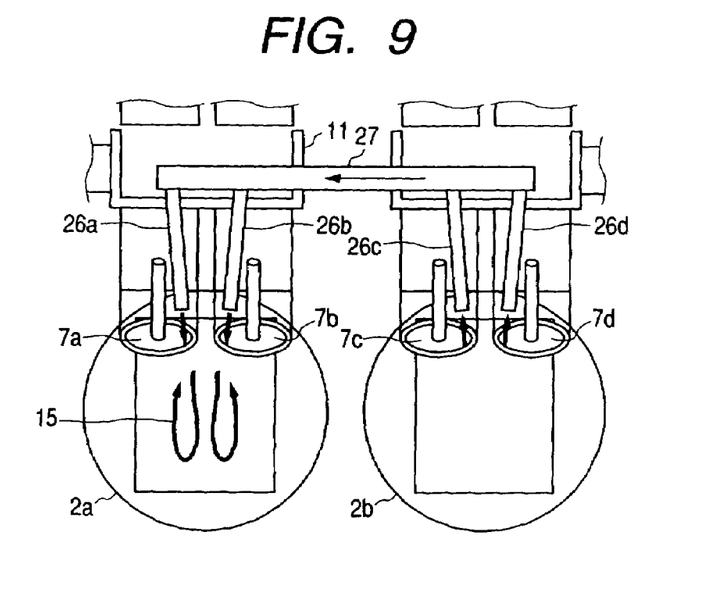
FIG. 9 is a constructional view showing a direct injection type internal combustion engine of a further embodiment according to the present invention which is seen from an upper face.
Figure 10:
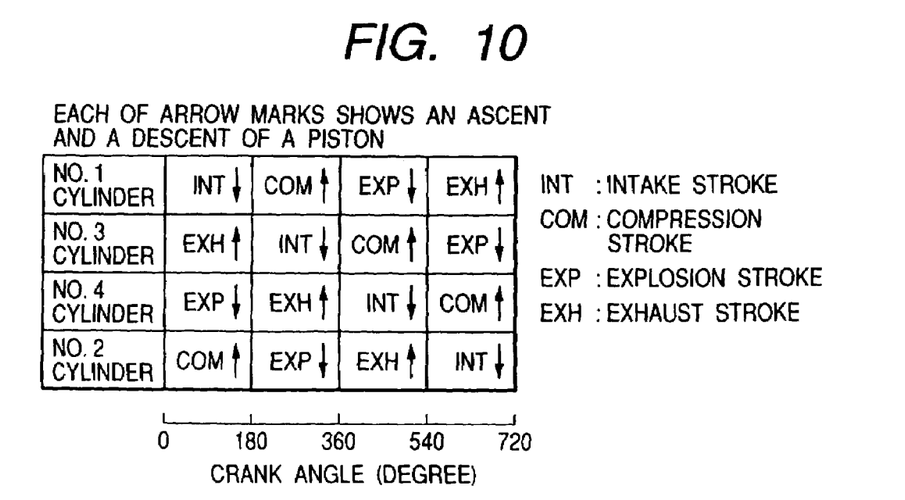
FIG. 10 is an operational view showing a direct injection type internal combustion engine of a further embodiment according to the present invention.

FIG. 9 is a view showing the engine which is seen from an upper portion of the engine construction shown in FIG. 8. The piston 2a of the first cylinder and the piston 2b of the second cylinder are provided. The passage 27 communicates the intake port 15 of the first cylinder and the intake port 15 of the second cylinder. As shown in FIG. 10, when the first cylinder presents the intake stroke, the second cylinder presents the compression stroke and the piston 2b is ascended. For this reason, as shown in FIG. 11, intake valves 7c and 7d of the second cylinder are opened and the air which is compressed in the second cylinder is passed through the passages 26c and 26d and injected from the passages 26a and 26b of the first cylinder and then the tumble flow 15 is generated in the cylinder 2a.

FIG. 10 shows a stroke procedure of the four-cylinder engine. The intake procedure is No. 1-No. 3-No. 4-No. 2. As to the move of the piston 2, the first cylinder and the fourth cylinder, and the second cylinder and the third cylinder ascends and descends with the same timing.

Figure 11:
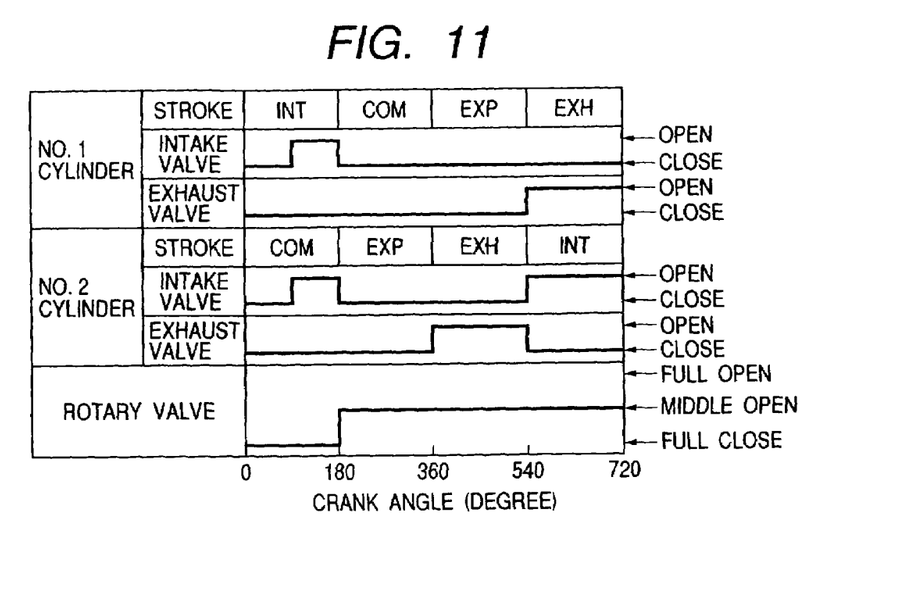
FIG. 11 is a constructional view showing a direct injection type internal combustion engine of a further embodiment according to the present invention.

FIG. 11 shows an operational timing of the intake valve, the exhaust valve, and the rotary valve shown in FIG. 9. This case is that the operation timing starts from the intake timing of the first cylinder. In a last half of the intake stroke of the first cylinder, the intake valve is opened. With the same timing with this, the intake valve of the second cylinder is opened, as shown in FIG. 9 the air is flown from the second cylinder to the first cylinder.

Herein, the timing of the intake valve of the first cylinder and the timing of the intake valve of the second cylinder are performed with the same, however even there is the difference, the effects similarly to the above can be obtained. When the intake stroke of the first cylinder has finished, the rotary valve 11 is opened until a middle opening degree (the upper side passage of the intake port is opened) and enters to the idling operation. In engine of this embodiment according to the present invention, only the cylinder which starts at the first time carries out the strength of the tumble flow.

Figure 12:
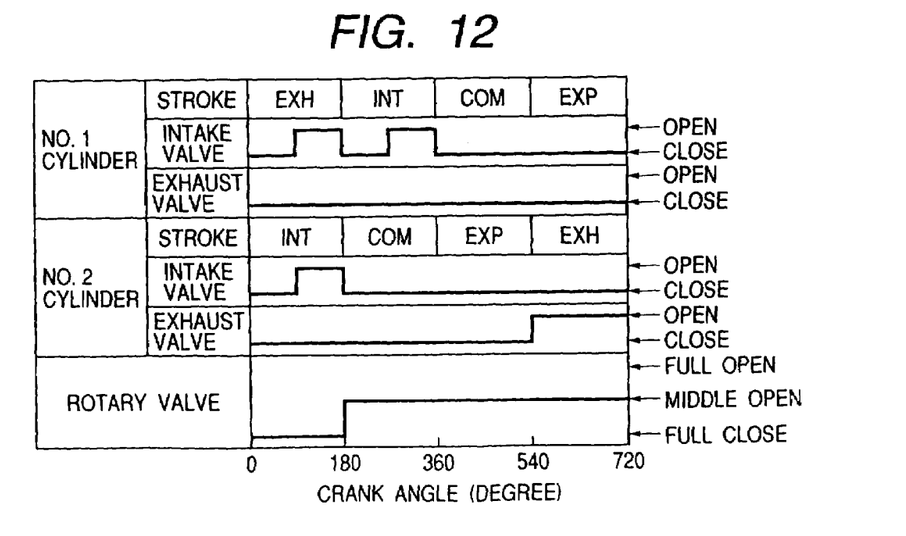
FIG. 12 is a constructional view showing a direct injection type internal combustion engine of a further embodiment according to the present invention.

FIG. 12 shows a case in which it starts from the second cylinder. When the second cylinder presents the intake stroke, the first cylinder presents the exhaust stroke. However, the exhaust valve of the first cylinder is left to present to a closing state and the intake valve is opened in the last half of the intake stroke of the second cylinder. In this time, reversibly to the case shown in FIG. 9, the air is flown from the first cylinder to the second cylinder and then the tumble flow is generated in the cylinder of the second cylinder. Next to the intake of the second cylinder, the intake of the first cylinder is carried out, however the second cylinder presents the compression stroke and the air is not introduced to the first cylinder (when the air is introduced into the first cylinder, it can not burned in the second cylinder).

For this reason, the rotary valve 11 is opened, the air is inhaled from the upper portion passage of the intake port 5, and then the engine enters to the idling operation. Herein, the intake valve of the first cylinder is opened in the last half of the intake stroke and then the tumble flow is strengthened. In the engine of this embodiment according to the present invention, the case in which the engine starts from the first cylinder and the second cylinder is explained and the case in which the engine starts from the third cylinder and the fourth cylinder is carried out similarly to.

Figure 13:
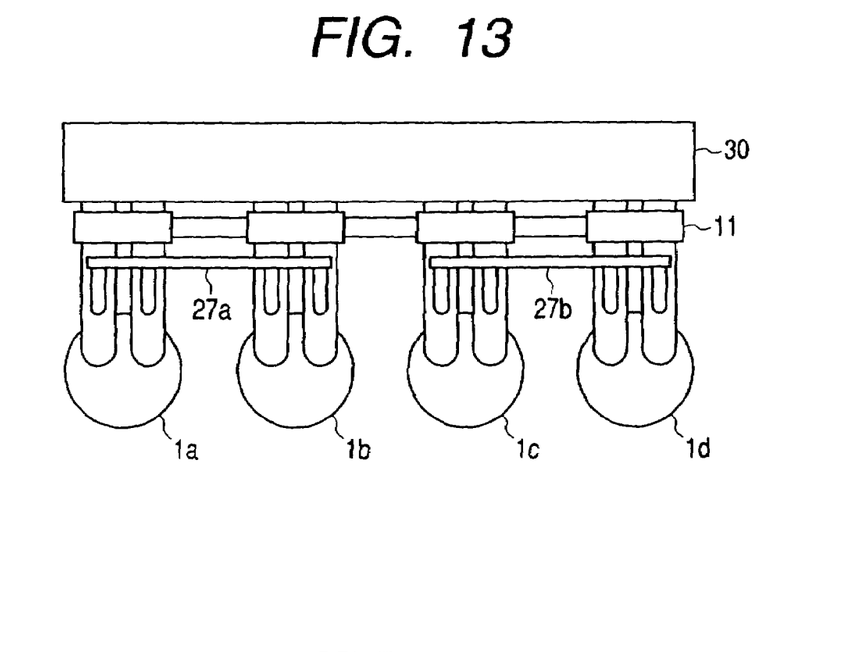
FIG. 13 is a constructional view showing a direct injection type internal combustion engine of a further embodiment according to the present invention.

FIG. 13 shows a construction of the intake system of the four-cylinder engine. Between a collector 30 and a respective cylinders 1a, 1b, 1c, and 1d, the rotary valve 11 is arranged, and a passage 27a for communicating the first cylinder and the second cylinder and a passage 27b for communicating the third cylinder and the fourth cylinder are provided. With the construction of the intake system with above, it can correspond to the starting of every cylinder from the first cylinder to the fourth cylinder.

Figure 14:
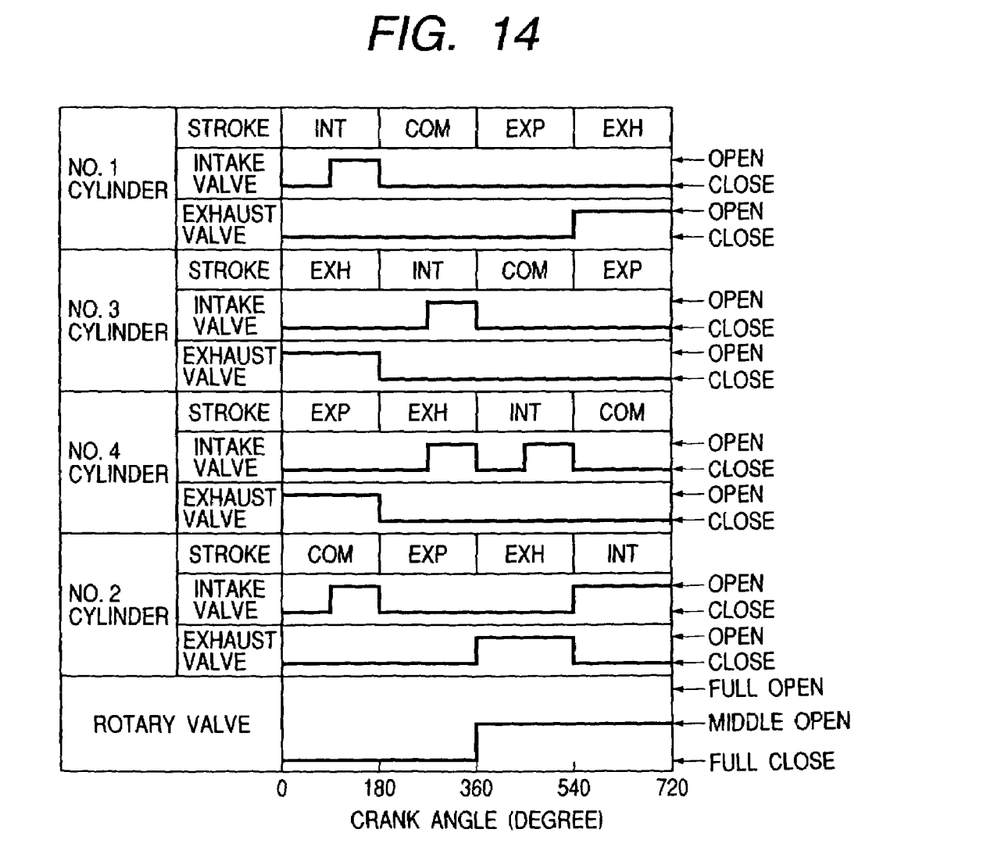
FIG. 14 is an operational view showing a direct injection type internal combustion engine of a further embodiment according to the present invention.

Next, the engine of a further embodiment according to the present invention of a case in which with the construction shown in FIG. 13 the engine starts from a specific cylinder (the first cylinder or the fourth cylinder) will be explained. FIG. 14 shows a case in which the engine starts from the first cylinder. In a case in which the first cylinder presents the intake stroke, the second cylinder presents the compression stroke, and using the passage 27a the air in the second cylinder is flown into the first cylinder. Next, the third cylinder presents the intake stroke.

In this time, the exhaust stroke of the fourth cylinder is utilized, and the exhaust valve of the fourth cylinder is closed and the intake valve is opened and further using the passage 27b the air in the fourth cylinder is flown into the third cylinder. Next, from the fourth cylinder the engine is transferred to an ordinary idling operation (from the collector 30 the air is introduced). For this reason, the rotary valve 11 is opened unit the middle opening degree. It is possible to perform an opening period of the intake valve in this time in the last half of the intake stroke or a firstly intake stroke.

FIG. 14 shows a case in which the starting begins from the first cylinder but it is possible to start from the fourth cylinder. In this case, in the fourth cylinder and the second cylinder, it forms the starting in which the tumble flow is strengthened and from the first cylinder an ordinary idling operation enters. With this construction, from the starting in the two cylinders the tumble flow can be strengthened.

Figure 15:
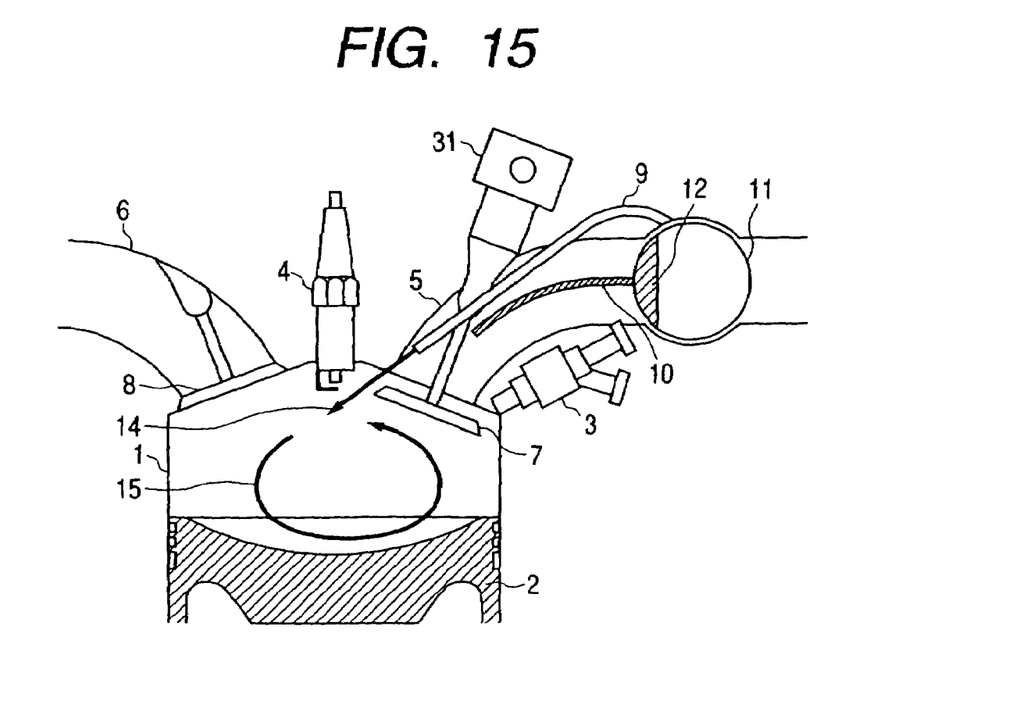
FIG. 15 is a constructional view showing a direct injection type internal combustion engine of a further embodiment according to the present invention.

FIG. 15 is a direct injection type internal combustion engine of a further embodiment according to the present invention of the construction shown in FIG. 1. A variable valve mechanism 31 in which the opening and closing time of the intake valve 7 can be adjusted is added. Since variable valve mechanism 31 is opened slowly, during the starting time after the pressure in the cylinder 1 has became low and the intake valve is opened and then the tumble flow can be strengthened. Further, when the intake valve is opened slowly, since an actual air inhale time can be shortened, the diameter of the passage 9 can be made large.

According to the present invention, from the starting of the engine (from the firstly combustion cylinder) it is possible to carry out the stable stratification combustion. In accordance with the stratification combustion, in the exhaust air a large quantity of the surplus oxygen remains. Further the present invention can be applied to the engine, in such an engine in the exhaust stroke twice (two time) fuel injection is carried out and the after burn phenomenon is caused in the exhaust port and then the exhaust gas temperature can be raised.

What is claimed is:

1. A direct injection type internal combustion engine comprising:
    a fuel injector for injecting directly a fuel into a combustion chamber;
    an ignition plug for igniting an air-fuel mixture of said combustion chamber; and
    an air-fuel mixture induction device which comprises a conduit with an air injection port having a cross-sectional area smaller than a total cross-sectional area of an air flow passage formed in a vicinity of a single air intake derived for directing the fuel toward said ignition plug and forming an air-fuel mixture region which enhances sparking in a vicinity of said ignition plug such that during a starting of said internal combustion engine, air having a flow velocity higher than a flow velocity from a main intake air passage is supplied from said air injection port to said cylinder with a tumble air flow being formed in said cylinder.

2. A direct injection type internal combustion engine, comprising:
    a fuel injector for injecting directly a fuel into a combustion chamber;
    an ignition plug for ignition an air-fuel mixture of said combustion chamber; and
    an air-fuel mixture induction device for directing the fuel toward said ignition plus and forming an air-fuel mixture region which enhances sparking in a vicinity of said ignition plug during a starting of said internal combustion engine, wherein said air-fuel mixture induction device comprises a tumble air supply device for forming a tumble air flow in said combustion chamber.

3. A direct injection type internal combustion engine, comprising:
- a fuel injector for injecting directly a fuel into a combustion chamber;
- an ignition plug for igniting an air-fuel mixture of said combustion chamber; and
- an air-fuel mixture induction device for directing the fuel toward said ignition plug and forming an air-fuel mixture region which enhances sparking in a vicinity of said ignition plug during a starting of said internal combustion engine, wherein
- said air-fuel mixture induction device comprises a narrow conduit passage provided adjacently side by side to a main intake air passage and a change-over valve provided in a branch portion between said conduit passage and said main intake air passage.

4. A direct injection type internal combustion engine, comprising
- an air and fuel mixture induction device for inducing a mixture of an air and a fuel in a surrounding portion of an ignition plug in a cylinder by operating immediately after an operation of a starting switch of said internal combustion engine, wherein;
- said air and fuel mixture induction device comprises a conduit with an air injection port having a cross-sectional area smaller than a total cross-sectional area of an air flow passage formed in a vicinity of a single intake air valve and functions with respect to a cylinder which enters firstly to an intake stroke after at least an operation of said starting switch to supply the fuel in a direction toward said ignition plug in said cylinder; and
- said air and fuel mixture is thereby induced to said surrounding portion of said ignition plug in said cylinder such that, at a starting time of the engine, air having a flow velocity higher than a flow velocity from a main intake air passage is supplied from said air injection port to said cylinder with a turnable air flow formed in said cylinder.

5. A direction injection type internal combustion engine comprising:
- a fuel injector for injecting directly a fuel into a combustion chamber;
- an ignition plug for igniting an air-fuel mixture of said combustion chamber; and
- an air-fuel mixture induction device for directing the fuel toward said ignition plug and forming air-fuel mixture region which enhances sparking in a vicinity of said ignition plug such that during a starting of said internal combustion engine, wherein a fuel injector is configured to inject the fuel after an intake valve has closed.

6. A direct injection internal combustion engine comprising
- an air and fuel mixture induction device for inducing a mixture of an air and fuel in a surrounding portion of an ignition plug in a cylinder by operating immediately after an operation of a starting switch of said internal combustion engine, wherein
- said air and fuel mixture induction device functions with respect to a cylinder which enters firstly to an intake stroke after at least an operation of said starting switch to supply the fuel in a direction toward said ignition plug in said cylinder; and
- said air and fuel mixture is thereby induced to said surrounding portion of said ignition plug in said cylinder, wherein a fuel injector is configured to inject the fuel after an intake valve has been closed.

* * * * *